(12) United States Patent
Wu

(10) Patent No.: US 6,698,046 B1
(45) Date of Patent: Mar. 2, 2004

(54) AIR MATTRESS CONTROL UNIT

(75) Inventor: Shang-Neng Wu, Taipei (TW)

(73) Assignee: Sunflower Medical, L.L.C., Ellis, KS (US)

( * ) Notice: Subject to any disclaimer, the term of this patent is extended or adjusted under 35 U.S.C. 154(b) by 87 days.

(21) Appl. No.: 10/106,637

(22) Filed: Mar. 26, 2002

Related U.S. Application Data

(60) Provisional application No. 60/292,090, filed on May 17, 2001, and provisional application No. 60/278,925, filed on Mar. 26, 2001.

(51) Int. Cl.$^7$ .............................. A47C 27/10; F16K 3/26
(52) U.S. Cl. ......................... 5/713; 5/714; 137/625.15; 137/625.21
(58) Field of Search .......................... 5/713, 710, 706, 5/714, 914; 137/625.13, 625.15, 625.21

(56) References Cited

U.S. PATENT DOCUMENTS

| | | | |
|---|---|---|---|
| 4,197,837 A | * | 4/1980 | Tringali et al. ............. 601/150 |
| 4,745,647 A | | 5/1988 | Goodwin |
| 4,768,249 A | | 9/1988 | Goodwin |
| 4,797,962 A | | 1/1989 | Goode |
| 4,947,500 A | | 8/1990 | Seiler |
| 4,949,412 A | | 8/1990 | Goode |
| 4,949,414 A | | 8/1990 | Thomas et al. |
| 4,993,920 A | | 2/1991 | Harkleroad et al. |
| 5,003,654 A | | 4/1991 | Vrsalik |
| 5,005,240 A | | 4/1991 | Vrsalik |
| 5,044,029 A | | 9/1991 | Vrzalik |
| 5,051,673 A | | 9/1991 | Goodwin |
| 5,052,067 A | | 10/1991 | Thomas et al. |
| 5,062,167 A | | 11/1991 | Thomas et al. |
| 5,073,999 A | | 12/1991 | Thomas et al. |
| 5,090,077 A | | 2/1992 | Caden et al. |
| 5,092,007 A | | 3/1992 | Hasty |
| 5,095,568 A | | 3/1992 | Thomas et al. |
| 5,117,518 A | | 6/1992 | Schild |
| 5,121,513 A | | 6/1992 | Thomas et al. |
| 5,138,729 A | | 8/1992 | Ferrand |
| 5,142,719 A | | 9/1992 | Vrsalik |
| 5,152,021 A | | 10/1992 | Vrsalik |
| 5,152,319 A | | 10/1992 | Hannagan et al. |
| 5,182,826 A | | 2/1993 | Thomas et al. |
| 5,233,974 A | | 8/1993 | Senoue et al. |

(List continued on next page.)

*Primary Examiner*—Robert G. Santos
(74) *Attorney, Agent, or Firm*—Chase Law Firm, L.C.

(57) ABSTRACT

The system of the present invention is a system for supplying air and controlling the flow of air into and out of the chambers of a patient supporting air mattress. It includes an electric motor powered variable speed blower, a two position rotary valve, air mattress supply lines communicating between the rotary valve and the chambers of the air mattress, a continuous exhaust line also connected to the rotary valve, stepper motor controlled valves in the air mattress supply lines, pressure sensors between the stepper motor controlled valves and the chambers of the air mattress and a control unit for controlling the stepper motor controlled valves to control the amount by which the chambers of the air mattress are inflated.

14 Claims, 2 Drawing Sheets

U.S. PATENT DOCUMENTS

| | | |
|---|---|---|
| 5,243,721 A | 9/1993 | Teasdale |
| 5,251,349 A | 10/1993 | Thomas et al. |
| 5,267,363 A | 12/1993 | Chaffee |
| 5,272,778 A | 12/1993 | Gore |
| 5,343,893 A | 9/1994 | Hogan et al. |
| 5,349,983 A | 9/1994 | Ozarowski et al. |
| 5,373,595 A * | 12/1994 | Johnson et al. ............. 5/710 |
| 5,375,273 A | 12/1994 | Bodine, Jr. et al. |
| 5,394,577 A | 3/1995 | James et al. |
| 5,619,764 A | 4/1997 | Lopau |
| 5,774,917 A | 7/1998 | Liu |
| 5,920,934 A * | 7/1999 | Hannagan et al. ............. 5/713 |
| 5,947,168 A | 9/1999 | Viard |
| 6,058,538 A * | 5/2000 | Chapman et al. ............. 5/713 |
| 6,108,843 A | 8/2000 | Suzuki et al. |
| 6,115,860 A | 9/2000 | Vrsalik |
| 6,152,176 A * | 11/2000 | Lin ..................... 137/625.21 |
| 6,253,402 B1 * | 7/2001 | Lin ............................. 5/713 |
| 6,257,269 B1 | 7/2001 | Wu |
| 6,266,833 B1 * | 7/2001 | Lin ............................. 5/713 |
| 6,571,825 B2 * | 6/2003 | Stacy ................... 137/624.13 |

* cited by examiner

AIR MATTRESS CONTROL UNIT

CROSS REFERENCES TO RELATED APPLICATIONS

This application claims the benefit of U.S. Provisional Patent Application No. 60/278,925 filed Mar. 26, 2001 and U.S. Provisional Patent Application No. 60/292,090 filed May 17, 2001.

FIELD OF THE INVENTION

This invention relates to a control system for controlling the flow of air to and from the chambers of a low air loss, patient supporting air mattress.

BACKGROUND OF THE INVENTION

Numerous systems have been proposed for controlling the flow of air to a low air loss inflatable air mattress. For example, Suzuki et al., in U.S. Pat. No. 6,108,843 employed a set of on/off valves in combination with pressure sensors to control pressures within a set of air sacks of an air mattress. Schild, in U.S. Pat. No. 5,117,518 discloses a rotating valve to alternately supply air to sets of air chambers in an air mattress. Thomas et, al, in U.S. Pat. No. 5,095,568 teach a flat plate valve system for distributing air to an air mattress.

The prior art evidences a search for a simple, reliable and compact means for providing a flow of air to the chambers of a low air loss air mattress. Numerous complex valves for controlling the flow of air have been developed.

One object of the present invention is to provide a simple, compact air mattress air supply and control system that is able to operate in different modes to supply air to different types of air mattresses.

Another object of the present invention is to provide an air mattress air supply and control system having a fan and motor that will not over heat as is now the case with many existing systems.

Yet another object of the present invention is to provide an air mattress air supply and control system that can receive an input corresponding to the weight of the supported patient, sense pressure in the chambers of various zones of the mattress, convert those sensed pressures to interface pressures between the patient and the mattress depending on the location of the zone and weight of the patent and then control the flow of air to an air mattress so that the patient/mattress interface pressure in each zone remains below a selected value to prevent the formation of bed sores. Still yet another object of the present invention is to provide an air mattress
   air supply and control system that can be quickly deflated with reverse air flow so that cardiopulmonary resuscitation can be administered to a patient supported by the mattress.

SUMMARY OF THE INVENTION

The system of the present invention is a system for supplying air and controlling the flow of air into and out of the chambers of a patient supporting air mattress. It includes an electric motor powered variable speed blower, a two position rotary valve, air mattress supply lines communicating between the rotary valve and the chambers of the air mattress, a continuous exhaust line also connected to the rotary valve, stepper motor controlled valves in the air mattress supply lines, pressure sensors between the stepper motor controlled valves and the chambers of the air mattress and a control unit.

The variable speed blower has an intake and an exhaust port. The inlet port of the two position rotary valve is connected to the blower exhaust port. The two position rotary valve can either direct the flow of air from the blower to the chambers of the air mattress in a pressurizing mode or route the flow of air from the air mattress into the intake of the blower in a vacuum mode in which the air mattress is rapidly deflated. When in the pressurizing mode, air exits the rotary valve through air mattress supply ports connected to the air mattres supply lines that supply air to various chambers of the air mattress. When in the pressurizing mode, a portion of the air supplied by the blower also flows out of the rotary valve through the continuous exhaust line. The continuous exhaust line provides a passageway for air to continuously flow through the blower to cool the blower. The stepper motor controlled valves in the air mattress supply lines can incrementally close to control the flow of air in the air mattress supply lines. The air pressure sensors which are located between the stepper motor controlled valves and the chambers of the air mattress sense the air pressure in the lines leading to the air mattress. The control unit receives signals from the air pressure sensors and responds to those signals by controlling the operations of the blower and the stepper motor controlled valves in such a way that the air pressure within the air mattress chambers is held within a selected pressure range.

BRIEF DESCRIPTION OF THE DRAWINGS

The invention and its many attendant objects and advantages will become better understood upon reading the following description of the preferred embodiment in conjunction with the following drawings, wherein.

DETAILED DESCRIPTION OF THE INVENTION

Figure 1:
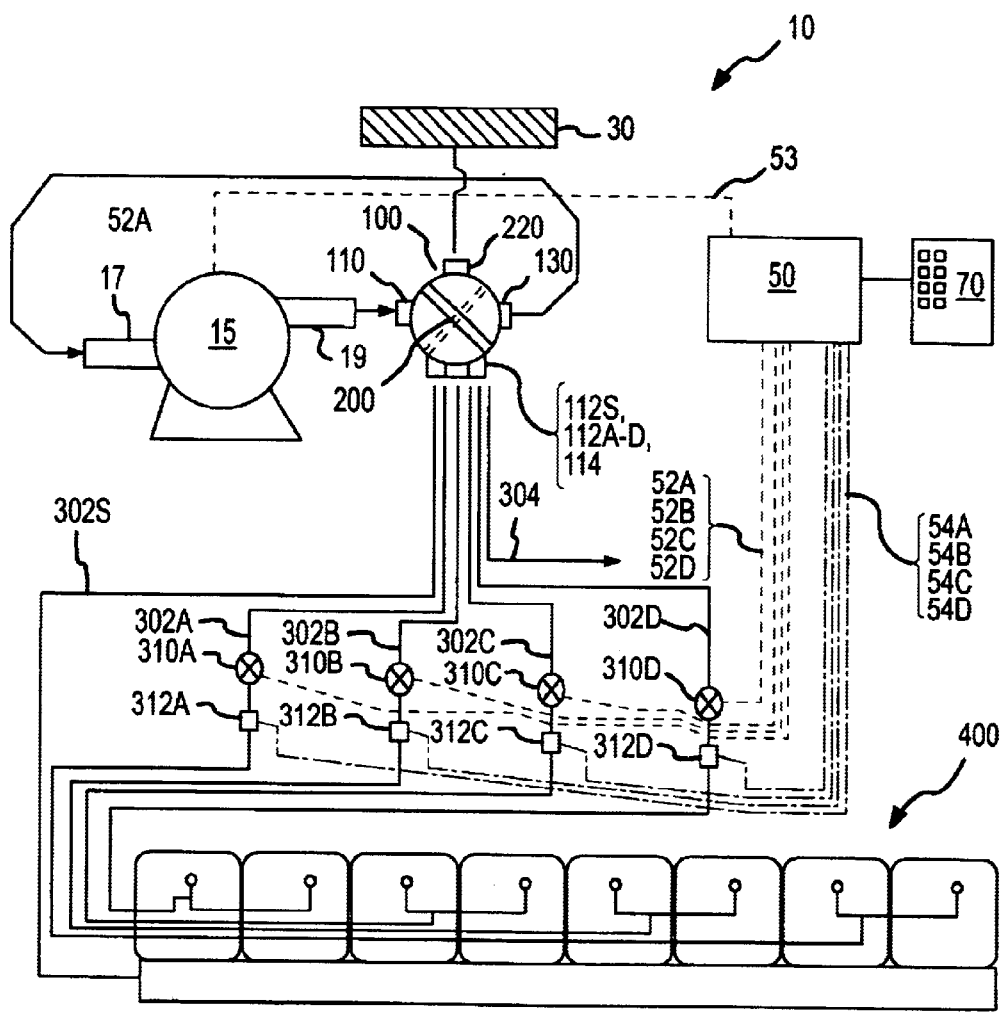
FIG. 1 is a schematic of the system of the present invention.

The system of the present invention 10 is shown in schematic form in FIG. 1. System 10 includes an electric motor powered blower 15, an intake filter 30, a two position rotary valve 100, air mattress supply lines 302A, 302B, 302C, 302D and 302S for supplying air to an air mattress 400, continues exhaust line 304, stepper motor controlled valves 310A, 310B, 310C, and 310D, pressure sensors 312A, 312B, 312C, and 312D, a control unit 50 and a control panel 70.

Variable speed blower 15 is powered by an electric motor (not shown) such as a 110V AC electric motor. Control unit 50 can control the power supplied to the blower motor. Blower 15 is a blower that is not a positive displacement air pump but rather a centrifugal fan type blower. This type of blower is appropriate in a system which supplies air to a low air loss air mattress such as air mattress 400. Air mattress 400 has a large number of small holes in its upper surfaces to permit air to constantly circulate around a supported patient.

Blower 15 has an intake port 17 and an exhaust port 19. Rotary valve 100 is shown schematically in FIG. 1 and is shown in greater detail in FIG. 2 and FIG. 3. As is shown in FIG. 1, rotary valve 100 has an inlet port 110 that is in pneumatic communication with exhaust port 19 of blower 15. The blower intake port 17 is connected by an air tight chamber (not shown) to an outlet port 130 in rotary valve 100. As can be seen schematically in FIG. 1, rotary valve 100 includes a gate member 200, which in FIG. 1, is shown in a first position for directing air flow in a pressurizing mode. Rotary valve 100 has a set of mattress supply ports 112S, 112A, 112B, 112C and 112D as well as a continues exhaust port 114. Continuos exhaust port 114 connects to a line 304 leading to the outside environment and provides a passageway for air to constantly flow through and cool blower 15. Supply port 112S connects to a line 302S that might be used to inflate a chamber or set of chambers of the air mattress that might remain inflated at a relatively constant pressure. A set of air mattress supply lines 302A, 302B, 302C and 302D connect to mattress supply ports 112A, 112B, 112C and 112D respectively and are each interrupted by control valves 310A, 310B, 310C and 310D and pressure sensors 312A, 312B, 312C and 312D respectively. Although, in the embodiment shown, air mattress supply lines 302A, 302B, 302C and 302D each have a control valve and a sensor, it is possible to configure a system where only some of those supply lines include a control valve and a sensor.

Each of these identical control valve, sensor arrangements can be better understood by considering the control valve, sensor arrangement of air mattress supply line 302A which leads to a chamber or set of chambers in air mattress 400. Pressure sensor 312A, is used to sense the air pressure in line 302A. Control valve 310A controls the flow of air in line 302A between rotary valve 100 and air mattress 400. Control valve 310A includes a stepper motor that incrementally opens and closes valve 310A. Both pressure sensor 312A and control valve 310A are operatively connected to control unit 50 via lines 54A and 52A respectively.

Preferably, control unit 50 is a programmable control unit that can receive inputs from a control panel 70. Contorl unit 50 is connected to pressure sensors 312A, 312B, 312C and 312D via sensor lines 54A, 54B, 54C and 54D respectively and to control valves 310A, 310B, 310C and 310D via control lines 52A, 52B, 52C and 52D respectively. Preferably, control unit 50 is also be operatively connected to the motor that powers blower 15 via a control line 53. Control unit 50 receives signals from pressure sensors 312A, 312B, 312C and 312D and responds to those signals by sending control signals to the stepper motors of control valves 310A, 310B, 310C and 310D and also, if necessary, by adjusting the amount of power supplied to the motor that powers blower 15.

The operation on one pressure sensor, control valve combination can be considered in order to understand the operation of all four pressure sensor, control valve arrangements. Control unit 50 receives a signal from pressure sensor 312A indicating the air pressure within the set of chambers of air mattress 400 that are supplied by line 302A. Control unit 50 responds to the pressure signal to determine if the pressure is within a selected range of pressures or above or below a selected range of pressures. Control unit 50 responds to the pressure signal by (1) transmitting a signal to incrementally close valve 310A when pressure sensor 312A indicates a pressure that is above the selected range of pressures or by (2) transmitting a signal to incrementally open valve 310A when pressure sensor 312A indicates a pressure that is below the selected range of pressures or by (3) transmitting a signal to the motor of blower 15 incrementally increase the supply of electrical power to the blower motor to increase the blower output if pressure sensor 312A indicates a pressure that is below the selected range of pressures and valve 310A is completely open.

System 10 may be connected to a type of mattress having transverse air chambers arranged in zones much like the arrangement shown in FIG. 1 and can be adapted to control the patient, mattress interface pressure to prevent the formation of bed sores. Control unit 50 could include an algorithm for converting sensed pressure to mattress, patient interface pressure. The mattress, patient interface pressure is the pressure of contact between the mattress surface and the body of the patient. If that pressure is too high, blood circulation under the patient's skin is restricted and the patient develops bed sores. Such an algorithm would require an input relating to the weight of the patient and would convert the measured back pressure from various zones of the mattress to an approximate mattress, patient interface pressures. Control unit 50 would then receive pressure values from pressure sensors 312A, 312B, 312C and 312D and respond by either opening or closing valves 310A, 310B, 310C and 310D to maintain pressure in the corresponding chambers of mattress 400 to pressures that correspond to patient, mattress interface pressures that are just below the acceptable value. In this way control unit 50 can be adapted within the invention system to control pressure in a mattress to prevent bed sores.

The selected pressure range targeted by control unit 50 can be a constant set of values or a set of values that change with time depending on a pre-programmed mode that might be selected using control panel 70. For example, air mattress 400 might be configured differently from what is shown in FIG. 1, so that the set of chambers supplied by line 302A would all be on one lateral side of the air mattress. Control panel 70 might further have a mode selection option for a patient turning mode whereby chambers on alternate lateral sides of the air mattress are alternately inflated and deflated in unison in a cyclic fashion. In this case, the targeted pressure ranges would be constantly changing as sets of air chambers are inflated and deflated.

System 10 may also be connected to another type of mattress having transverse air chambers arranged in a transverse, alternating manner. A pulsating air mattress could be arranged where such alternating, staggered sets of chambers would be inflated and deflated in accordance with a programmed set of instructions.

Accordingly, system 10 is highly versatile and can be used to supply air to various types of air mattresses such as a rotational therapy mattress, a pulsating mattress or constant pressure mattress.

System 10 is also capable of supporting a cardiopulmonary resuscitation (CPR) mode wherein an air mattress connected to the system can be quickly deflated so that the patient may be lowered to a firm surface for CPR. The CPR mode is activated by turning gate member 200 of rotary valve 100 to a second position shown in phantom in FIG. 1. When in the second position, gate member 200 directs air from air mattress 400 into intake 17 of blower 15 while air leaving blower 15 is directed through filter 30 to the outside environment. Because air from air mattress 400 is now routed to intake 17 of blower 15, air mattress 400 quickly deflates.

Figure 2:
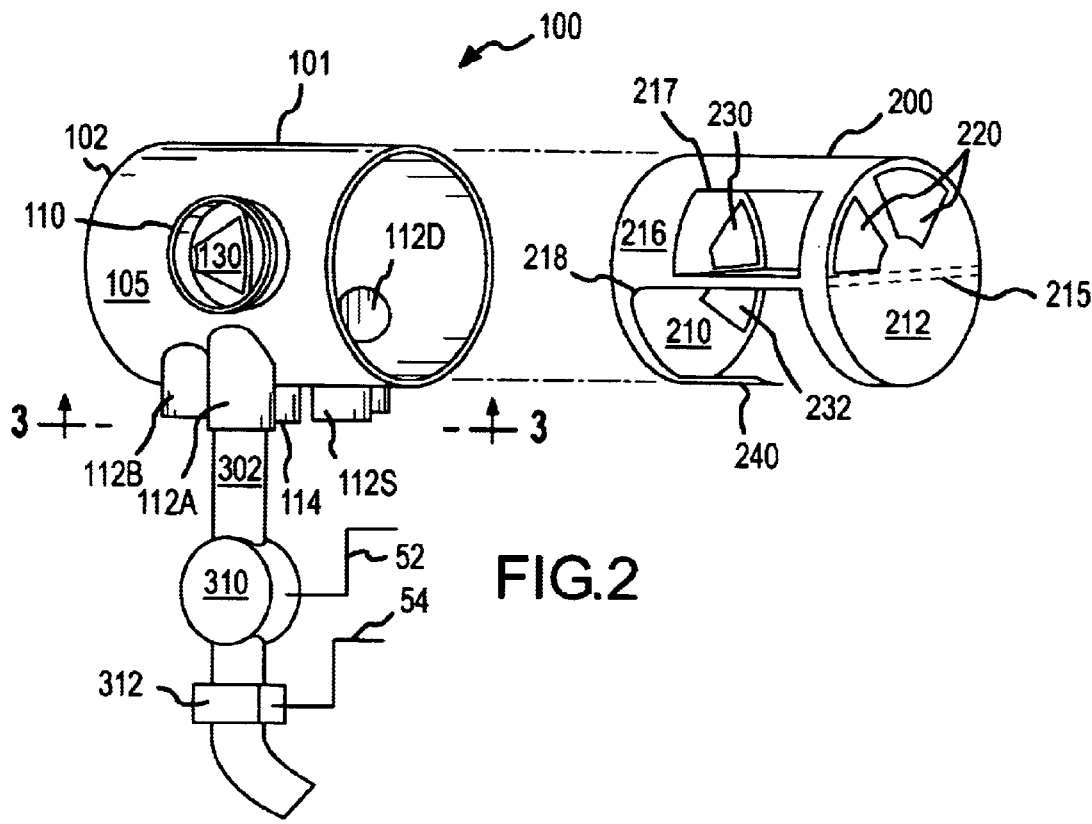
FIG. 2 is a perspective view of the rotary valve of the system of the present invention.
Figure 3:
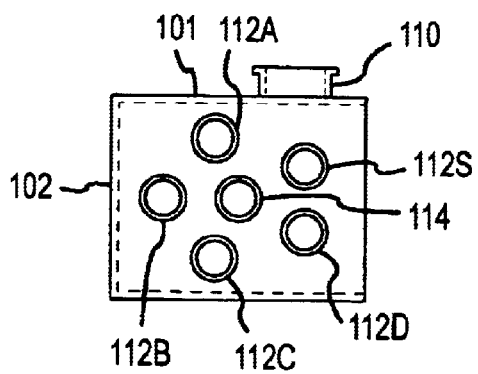
FIG. 3 is a bottom view of the rotary valve of the system of the present invention taken from plane 3—3 of FIG. 2.

The arrangement of rotary valve 100 is illustrated in detain in FIG. 2. As can be seen in FIG. 2, rotary valve 100 includes a valve housing 101 and a gate member 200. Valve housing 101 has an open cylindrical shape and includes an outer wall 105 and a base wall 102. Outer wall 105 has an inlet port 110 that connects with exhaust port 19 of blower 15. Outer wall 105 of valve housing 101 also has air mattress supply ports 112S, 112A, 112B, 112C and 112D for supplying air to various sets of chambers of air mattress 400 shown in FIG. 1 as well as a continuous exhaust port 114. Air mattress supply ports 112S, 112A, 112B, 112C and 112D and exhaust port 114 are shown more clearly in FIG. 3 which is a view taken from plane 3—3 of FIG. 2. Base wall 102 of housing 101 has an outlet port 130. Outlet port 130 and intake port 110 are centered upon the same diametric plane of housing 101.

Gate member 200 is received by valve housing 101 so that it can rotate within valve housing 101. Gate member 200 has a first circular end wall 210 at one end, a second circular end wall 212 at the opposite end, a cylindrical wall 216 and a horizontal wall 215 that extends between and connects first end wall 210 and the second end wall 212. First end wall 210 of gate member 200 comes into close proximity or contact with base wall 102 of housing 101 when gate member 200 in inserted into housing 101. Second end wall 212 closes rotary valve 100 when gate member 200 in inserted into housing 101. Horizontal wall 215 divides gate member 200 into a first portion which is above horizontal wall 215 in FIG. 2 and a second portion which is below horizontal wall 215 in FIG. 2. Second end wall 212 has first ports 220 above horizontal wall 215. First ports 220 could easily be combined into one port. First ports 220 can be positioned anywhere in second end wall 212 above horizontal wall 215. First end wall 210 has a second port 230 positioned above horizontal wall 215 and a third port 232 positioned below horizontal wall 215. As can be better understood by referring to FIG. 1, ports 220 lead to filter 30 and the outside environment. Cylindrical wall 216 of gate member 200 is sized to fit within housing 101. An upper wall port 217 opens into the upper chamber of gate member 200 while a very extensive lower wall port 218 opens up almost all of the lower chamber of gate member 200. Although upper wall port 217 is shown in FIG. 2 as an opening in a substantially complete cylindrical wall 216, gate member 200 can still function even if upper wall port 217 is as extensive as lower wall port 218. With such an open configuration, gate member 200 presents first and second portions that are mostly bounded by the first and second end walls of gate member 200, horizontal wall 215 and cylindrical outer wall 105 of housing 101 when gate member 200 is inserted into housing 101.

The various ports and openings of valve housing 101 and gate member 200 are arranged so that the valve can operate in a first position in which pressurized air is delivered to the air mattress a second position in which air is pulled from the air mattress to quickly deflate the air mattress. Air mattress supply ports 112S, 112A, 112B, 112C and 112D and exhaust port 114 are positioned in a pattern that is adjacent to inlet port 110 so that when gate member 200 is tilted in the first position, air mattress supply ports 112S, 112A, 112B, 112C and 112D, exhaust port 114 and inlet port 110 are on one side of horizontal wall 215 of gate member 200 in communication with the second portion of the gate member.

When gate member 200 is in the first position, air can flow through inlet port 110 of housing 101, into the second portion of gate member 200 and then out through air mattress supply ports 112S, 112A, 112B, 112C and 112D and exhaust port 114. Also while gate member 215 is in the first position, second port 230 of gate member 200 is aligned with outlet port 130 of valve housing 101 (while third port 232 is blocked by base wall 102 of valve housing 101) so that outside air can flow through first ports 220 in second end wall 212, into the first portion of gate member 200, through second port 230 of gate member 200, through outlet port 130 of housing 101 and into the intake of blower 15. When gate member 200 is in the first, pressurizing position, air from blower 15 is routed to air mattress 400 shown in FIG. 1, while outside air is drawn in through filter 30 shown in FIG. 1 and into the intake of blower 15.

When gate member 200 is turned to a second position, horizontal wall 215 is interposed between inlet port 110 and air mattress supply ports 112S, 112A, 112B, 112C and 112D as well as exhaust port 114. When the gate member 200 is in the second position, third port 232 of gate member 200 aligns with outlet port 130 of housing 101 so that air is pulled in through air mattress supply ports 112S, 112A, 112B, 112C and 112D, through third port 232, then through outlet port 130 of housing 101 and into the intake of blower 15. Also when gate member 200 is in the second, blower exhaust air passes through inlet port 110 of housing 101 and out through first ports 220 into the outside environment (while second port 230 is blocked by base wall 102 of housing 101). When gate member 200 is in this second position, air is drawn out of air mattress 400 shown in FIG. 1 and blower exhaust is expelled into the outside environment through filter 30 shown in FIG. 1 causing air mattress 400 to quickly deflate. To facilitate the vacuum mode, it may also be advantageous to locate exhaust port 114 in an outside radial position such as in the location of air mattress supply port 112B shown in FIG. 3 and then to add a tab 240 to gate member 200 that only obstructs the relocated exhaust port 114 when gate member 200 is in the second position. This would stop air back flow through exhaust line 304 when the gate member is in the second, vacuum position. In the alternative, it may be advantageous to place a one way flapper valve in line exhaust line 304 to prevent such back flow when the system is operating in the rapid deflating vacuum mode.

Preferably, rotary valve 100 can be fashioned from injected molded plastic. It is preferable to mount gate member 200 in a spring biased manner so that gate member is pushed into housing 101 to make firm contact. Because gate member 200 is intended to be operated manually, it may also be advantageous to mount gate member 200 within housing 101 so that it can only move between the first and second positions. Moreover, it would be preferable to have corresponding protrusions and recesses in first end wall 210 of gate member 200 and base wall 101 of housing 101 respectively that engage each other when gate member 200 is in a first or a second position to provide an operator with tactile feed-back to indicate that rotary valve 100 is either in the first or the second position but not between the first or the second position.

Obviously, in view of the preferred embodiments described above, numerous modifications and variations of the preferred embodiments disclosed herein are possible and will occur to those skilled in the art in view of this description. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly to be understood that these modifications and variations, and the equivalents thereof, are to be considered within the spirit and scope of the invention as defined by the following claims, wherein,

I claim:

1. A system for controlling the flow of air from between an outside environment, a blower having an intake port and an exhaust port and the chambers of a patient supporting low air loss air mattress, comprising;

a rotary valve having a housing and a gate member, the housing including an inlet port communicating with the blower exhaust port, air mattress supply ports communicating with lines supplying the chambers of the air mattress and an outlet port communicating with the blower intake port, the housing rotatably receiving the gate member, the gate member divided by a wall into a first portion and a second portion and further having a first port communicating the first portion with the outside environment, a second port communicating with the first portion and a third port communicating with the second portion, the gate member rotatable between a first position aligning the gate member second port with the valve housing outlet port and communicating the gate member second portion with the valve housing inlet port and the air mattress supply ports, thereby communicating the blower intake with the outside environment and communicating the blower exhaust with the air mattress supply ports, and a second position aligning the gate member third port with the valve housing outlet port and communicating the first portion of the gate member with the valve housing inlet port and communicating the second portion of the gate member with the air mattress supply ports, thereby communicating the blower exhaust with the outside environment and communicating the blower intake with the air mattress supply ports to quickly deflate the air mattress.

2. The system of claim 1, wherein
the air mattress supply lines have electrically controlled valves for controlling the amount of air that can flow therethrough.

3. The system of claim 1, wherein
the air mattress supply lines have electrically controlled valves for controlling the amount of air that can flow therethrough, and,
the air mattress supply lines have pressure sensors interposed between the valves and the chambers of the air mattress for sensing the back pressure in the chambers of the air mattress, and wherein,
a control unit operatively connected to the pressure sensors and the electrically controlled valves receives signals from the pressure sensors and responds to those signals by opening or closing the valves until the pressure sensors indicate a predetermined pressure.

4. The system of claim 1, wherein
the air mattress supply lines have electrically controlled valves for controlling the amount of air that can flow therethrough,
the air mattress supply lines have pressure sensors interposed between the valves and the chambers of the air mattress for sensing the back pressure in the chambers of the air mattress, and,
a control unit is operatively connected to the pressure sensors and the valves, the programmable control unit receiving pressure signals from the pressure sensors and responding to those pressure signals by (1) determining if the pressure signal indicates if a pressure is within a selected range of pressures or above or below a selected range of pressures, (2) transmitting a signal to incrementally close the valve in a line having a pressure that is above the selected range of pressures, (3) transmitting a signal to incrementally open the valve in a line having a pressure that is below the selected range of pressures.

5. The system of claim 1, wherein
the air mattress supply lines have stepper motor controlled valves for controlling the amount of air that can flow therethrough,
the air mattress supply lines have pressure sensors interposed between the valves and the chambers of the air mattress for sensing the back pressure in the chambers of the air mattress, and,
a control unit is operatively connected to the blower motor, the pressure sensors and the valves, the control unit receiving pressure signals from the pressure sensors and responding to those pressure signals by (1) determining if the pressure signal indicates if a pressure is within a selected range of pressures or above or below a selected range of pressures, (2) transmitting a signal to incrementally close the valve in a line having a pressure that is above the selected range of pressures, (3) transmitting a signal to incrementally open the valve in a line having a pressure that is below the selected range of pressures, (4) transmitting a signal to incrementally increase the supply of electrical power to the blower motor to increase the blower output if a pressure in a line is below a selected range of pressures and the valve in that line is completely open.

6. The system of claim 1, wherein
the air mattress supply lines have stepper motor controlled valves for controlling the amount of air that can flow therethrough,
the air mattress supply lines have pressure sensors interposed between the valves and the chambers of the air mattress for sensing the back pressure in the chambers of the air mattress,
a control unit is operatively connected to the blower motor, the pressure sensors and the valves, the control unit receiving pressure signals from the pressure sensors and responding to those pressure signals by (1) determining if the pressure signal indicates if a pressure is within a selected range of pressures or above or below a selected range of pressures, (2) transmitting a signal to incrementally close the valve in a line having a pressure that is above the selected range of pressures, (3) transmitting a signal to incrementally open the valve in a line having a pressure that is below the selected range of pressures, (4) transmitting a signal to incrementally increase the supply of electrical power to the blower motor to increase the blower output if a pressure in a line is below a selected range of pressures and the valve in that line is completely open,
and the control unit is able to receive inputs for the height and weight of the patient, the control unit also having an algorithm for determining acceptable air mattress supply line back pressures corresponding to patient and mattress interface pressures given input values for patient weight and height, whereby the valves may be controlled to maintain patient and mattress interface pressures that are below pre-determined values.

7. A system for controlling the flow of air from between an outside environment, a blower having an intake port and an exhaust port and the chambers of a patient supporting low air loss air mattress, comprising;

a rotary valve having a cylindrical housing and a gate member, the housing including a base wall and a cylindrical outer wall, an inlet port in the outer wall that communicates with the blower exhaust port, a pattern of air mattress supply ports in the outer wall communicating with lines supplying chambers of the air mattress and an outlet port in the base wall communicating with the blower intake port, the gate member having a first end wall a second end wall, and a horizontal wall connecting the first end wall and the second end wall that divides the gate member into a first portion and a second portion, the gate member further having a first port in the second end wall communicating the first portion with the outside environment, a second port in the first end wall communicating with the first portion, and a third port in the first end wall communicating with the second portion, the gate member rotatably received by the housing so that the gate member first end wall is closely proximate to the housing base wall, the gate member rotatable between a first position aligning the gate member second port with the housing outlet port, blocking the gate member third port with the housing base wall and communicating the gate member second portion with both the valve housing inlet port and the air mattress supply ports, thereby communicating the blower intake with the outside environment and communicating the blower exhaust with the air mattress supply ports, and a second position aligning the gate member third port with the housing outlet port as the gate member, blocking the gate member second port with the housing base wall, communicating the gate member first portion with the valve housing inlet port and communicating the gate member second portion with the air mattress supply ports, thereby communicating the blower exhaust with the outside environment and communicating the blower intake with the air mattress supply ports to quickly deflate the air mattress.

8. The system of claim 7, wherein
   the air mattress supply lines have electrically controlled valves for controlling the amount of air that can flow therethrough.

9. The system of claim 7, wherein
   the air mattress supply lines have electrically controlled valves for controlling the amount of air that can flow therethrough, and,
   the air mattress supply lines have pressure sensors interposed between the valves and the chambers of the air mattress for sensing the back pressure in the chambers of the air mattress and wherein,
   a control unit operatively connected to the pressure sensors and the electrically controlled valves receives signals from the pressure sensors and responds to those signals by opening or closing the valves until the pressure sensors indicate a pressure within a preselected pressure range.

10. The system of claim 7, wherein
    the air mattress supply lines have electrically controlled valves for controlling the amount of air that can flow therethrough,
    the air mattress supply lines have pressure sensors interposed between the valves and the chambers of the air mattress for sensing the back pressure in the chambers of the air mattress, and,
    a programmable control unit is operatively connected to the pressure sensors and the valves, the programmable control unit receiving pressure signals from the pressure sensors and responding to those pressure signals by (1) determining if the pressure signal indicates if a pressure is within a selected range of pressures or above or below a selected range of pressures, (2) transmitting a signal to incrementally close the valve in a line having a pressure that is above the selected range of pressures, (3) transmitting a signal to incrementally open the valve in a line having a pressure that is below the selected range of pressures.

11. The system of claim 7, wherein
    the air mattress supply lines have stepper motor controlled valves for controlling the amount of air that can flow therethrough,
    the air mattress supply lines have pressure sensors interposed between the valves and the chambers of the air mattress for sensing the back pressure in the chambers of the air mattress, and,
    a programmable control unit is operatively connected to the blower motor, the pressure sensors and the valves, the programmable control unit receiving pressure signals from the pressure sensors and responding to those pressure signals by (1) determining if the pressure signal indicates if a pressure is within a selected range of pressures or above or below a selected range of pressures, (2) transmitting a signal to incrementally close the valve in a line having a pressure that is above the selected range of pressures, (3) transmitting a signal to incrementally open the valve in a line having a pressure that is below the selected range of pressures, (4) transmitting a signal to incrementally increase the supply of electrical power to the blower motor to increase the blower output if a pressure in a line is below a selected range of pressures and the valve in that line is completely open.

12. A rotary valve for controlling the flow of air from between a blower having an intake port and an exhaust port, an outside environment and the chambers of a patient supporting low air loss air mattress, comprising;

a housing and a gate member, the housing including an inlet port communicating with the blower exhaust port, air mattress supply ports communicating with lines supplying chambers of the air mattress and an outlet port communicating with the blower intake port, the housing rotatably receiving the gate member, the gate member divided by a wall into a first portion and a second portion and further having a first port communicating the first portion with the outside environment, a second port communicating with the first portion and a third port communicating with the second portion, the gate member rotatable between a first position aligning the gate member second port with the valve housing outlet port and communicating the gate member second portion with the valve housing inlet port and the air mattress supply ports, thereby communicating the blower intake with the outside environment and communicating the blower exhaust with the air mattress supply ports, and a second position aligning the gate member third port with the valve housing outlet port and communicating the first portion of the gate member with the valve housing inlet port and communicating the second portion of the gate member with the air mattress supply ports, thereby communicating the blower exhaust with the outside environment and communicating the blower intake with the air mattress supply ports to quickly deflate the air mattress.

13. The rotary valve of claim 12 wherein, the housing is cylindrical having a base wall and a cylindrical outer wall, the outlet port of the ousing is disposed in the base wall and the inlet port and the air mattress supply ports are disposed in the cylindrical outer wall.

14. The rotary valve of claim 12 wherein, the housing is cylindrical having a base wall and a cylindrical outer wall, the outlet port of the housing is disposed in the base wall and the inlet port and the air mattress supply ports are disposed in the cylindrical outer wall, wherein the gate member has a first end wall, a second end wall, the wall dividing the gate member into the first portion and the second portion is a horizontal wall connecting the first end wall and the second end wall, the first port is disposed in the second end wall in communication with the first portion, the second port is disposed in the first end wall in communication with the first portion and the third port is disposed in the second end wall in communication with the second portion, and wherein the housing rotatably receives the gate member so that the gate member first end wall is in close proximity with the housing base wall.

* * * * *